United States Patent
Aubineau et al.

(10) Patent No.: US 9,679,526 B2
(45) Date of Patent: Jun. 13, 2017

(54) DISPLAY SYSTEM, AN INTEGRATED CIRCUIT FOR USE IN THE DISPLAY SYSTEM, AND A METHOD OF DISPLAYING AT LEAST TWO IMAGES ON AT LEAST TWO SCREENS

(71) Applicant: FREESCALE SEMICONDUCTOR, INC., Austin, TX (US)

(72) Inventors: Vincent Aubineau, Areches (FR); Guillaume Perret, Boulogne Billancourt (FR); Michael Andreas Staudenmaier, Munich (DE)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/954,283

(22) Filed: Nov. 30, 2015

(65) Prior Publication Data
US 2017/0004791 A1    Jan. 5, 2017

(30) Foreign Application Priority Data
Jun. 30, 2015   (WO) ................. PCT/IB2015/001564

(51) Int. Cl.
*G09G 3/36* (2006.01)
*G06F 3/14* (2006.01)
*G09G 5/00* (2006.01)

(52) U.S. Cl.
CPC ......... *G09G 3/3648* (2013.01); *G06F 3/1438* (2013.01); *G09G 5/008* (2013.01); *G09G 2300/04* (2013.01); *G09G 2310/08* (2013.01)

(58) Field of Classification Search
CPC ........... G09G 2310/08; G09G 2300/04; G09G 3/3648; G09G 5/008; G06F 3/1438

USPC ............................................. 345/1.1–2.3, 205
See application file for complete search history.

(56) References Cited

U.S. PATENT DOCUMENTS

| | | | |
|---|---|---|---|
| 7,533,402 B2* | 5/2009 | Demas | H04N 21/2365 345/1.1 |
| 8,384,832 B2 | 2/2013 | Fairgrieve et al. | |
| 8,433,939 B2 | 4/2013 | Chuang | |
| 2005/0066068 A1* | 3/2005 | Karaoguz | G06F 3/14 710/1 |

(Continued)

OTHER PUBLICATIONS

ADV7181D: 10-Bit, 10 channel Multiformat SDTV/HDTV Video Decoder and RGB Graphics Digitizer Data Sheet Analog Devices (Rev. A).

*Primary Examiner* — Dmitriy Bolotin

(57) ABSTRACT

A display system and a method of displaying a separate image on each one of at least two N-bit screens simultaneously, are hereby presented. The display system comprises at least two data processing units arranged for controlling the display of pixels on the corresponding N-bit screen, and a single merger block arranged for receiving pixel data from each respective data processing unit and for transmitting said pixel data to the corresponding N-bit screen. The merger block comprises a multiplexer unit arranged for selectively coupling one of the data processing units to an output of the merger block, a selection unit arranged for driving the multiplexer unit, and a clock generating unit adapted for generating at least one clock signal and for shifting the at least one generated clock signal compared to a main clock signal, the main clock signal and the generated clock signal being used to clock one of the N-bit screens, respectively.

20 Claims, 4 Drawing Sheets

(56) References Cited

U.S. PATENT DOCUMENTS

2006/0077116 A1* 4/2006 Chen .................. G09G 3/20
                                              345/1.1
2008/0170024 A1* 7/2008 Song .................. G09G 3/3614
                                              345/96
2014/0139740 A1   5/2014 Ohba et al.

* cited by examiner

DISPLAY SYSTEM, AN INTEGRATED CIRCUIT FOR USE IN THE DISPLAY SYSTEM, AND A METHOD OF DISPLAYING AT LEAST TWO IMAGES ON AT LEAST TWO SCREENS

CROSS REFERENCE TO RELATED APPLICATION(S)

The present application claims priority to International Patent Application No. PCT/IB2015/001564, entitled "A DISPLAY SYSTEM, AN INTEGRATED CIRCUIT FOR USE IN THE DISPLAY SYSTEM, AND A METHOD OF DISPLAYING AT LEAST TWO IMAGES ON AT LEAST TWO SCREENS," filed on Jun. 30, 2015, the entirety of which is herein incorporated by reference.

FIELD OF THE INVENTION

This invention relates to a display system, an integrated circuit for use in the display system, and a method of displaying at least two images on at least two screens.

BACKGROUND OF THE INVENTION

Display devices, such as those used in a vehicle, are capable of displaying information data to a user, by controlling pixels to create an image on a display screen. In order o enrich the informational content made available to a user and increase the safety of the user, there is a trend in the automotive industry that more information is displayed at the same time. In some applications, several display screens which may have various sizes and shapes are used for displaying information on one and the same display board, for instance. To that end, each screen is connected to an interface unit associated with a data processing unit which are arranged for controlling pixels of the display screen.

More generally speaking, it is nowadays common to use more than one display for displaying information in various applications such as automotive instrument cluster and infotainment console.

One with ordinary skills in the art seeking for an instrument cluster solution capable of supporting more than one display to allow displaying images on several screens would consider using an Integrated Circuit (IC) with a plurality of display interfaces to control each of the screens, respectively. However, this solution would give rise to costs that are substantially higher than in current state of the art. Indeed, the IC would have lots of pins and require more space on a printed circuit board (PCB) or increased silicon area in a single chip application such as a System-on-Chip (SoC) implementation.

Another solution could use multiple chips on a PCB with one chip per display, namely one chip for each of the screens to be controlled. But, again, this solution would add extra costs since several chips require more space on a PCB.

Still another solution may consist in using serial communication interfaces, for example: High Bandwidth Digital Interface (OpenLDI) or Digital Visual Interface (DVI) or High Definition Multimedia Interface (HDMI). Such a high-end solution reduces the number of pins but uses expensive interfaces which complicate the System-On-Chip design. Thus, it cannot be used for a cost efficient and relatively small display systems.

To summarize, all possible solutions described in the forgoing have a significant cost impact and increase the complexity of a display system having a plurality of display screens.

Such issues can be of particular importance in applications such as the display of information on automobile dashboards. In such applications, the cost constraint can be very stringent. In addition, the space available on the dashboard for displaying information to the driver is limited, whereas a significantly increasing number of information of many types needs to be displayed, as mentioned above.

Accordingly, there is a need for a display system with high display capabilities allowing display of images on a plurality of screens while requiring a limited number of connections to display the images and not significantly increasing neither the complexity nor the cost of such display system.

SUMMARY OF THE INVENTION

The present invention provides a display system, an integrated circuit for use in the display system, and a method of displaying at least two images on at least two screens as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

There will be described embodiments of an instrument cluster solution capable of supporting more than one display to allow displaying images on several screens, having applications, for instance, in an automotive instrument cluster and infotainment console. Prominent examples of these applications include a vehicle dashboard, since a dashboard is used to present safety relevant information to the driver (e. g. the driving speed, current gear selected, and warning messages regarding the running state of the vehicle), and also some additional information which increases the comfort of the driver (e. g. the title of a song being played, economy drive indications, map information and driving instructions for navigation purpose, and the like).

A display system and a method of displaying images, which are described hereinafter, allow improving effectiveness of a display system and further allow an important cost saving with respect to state-of-the-art solutions supporting more than one display for displaying information, by providing only one merger block for all of the N-bit screens. One of the advantages of the proposed display system and the associated method of displaying is that the number of connection lines and thus the number of pins are limited. Further, a Quad Flat Package (QFP), which is cheaper and simple to debug and to implement than a plurality of display interfaces, can thus be used for single chip applications. This display system and the associated method of displaying further allow keeping high display efficiency on all N-bit screens.

Figure 1:
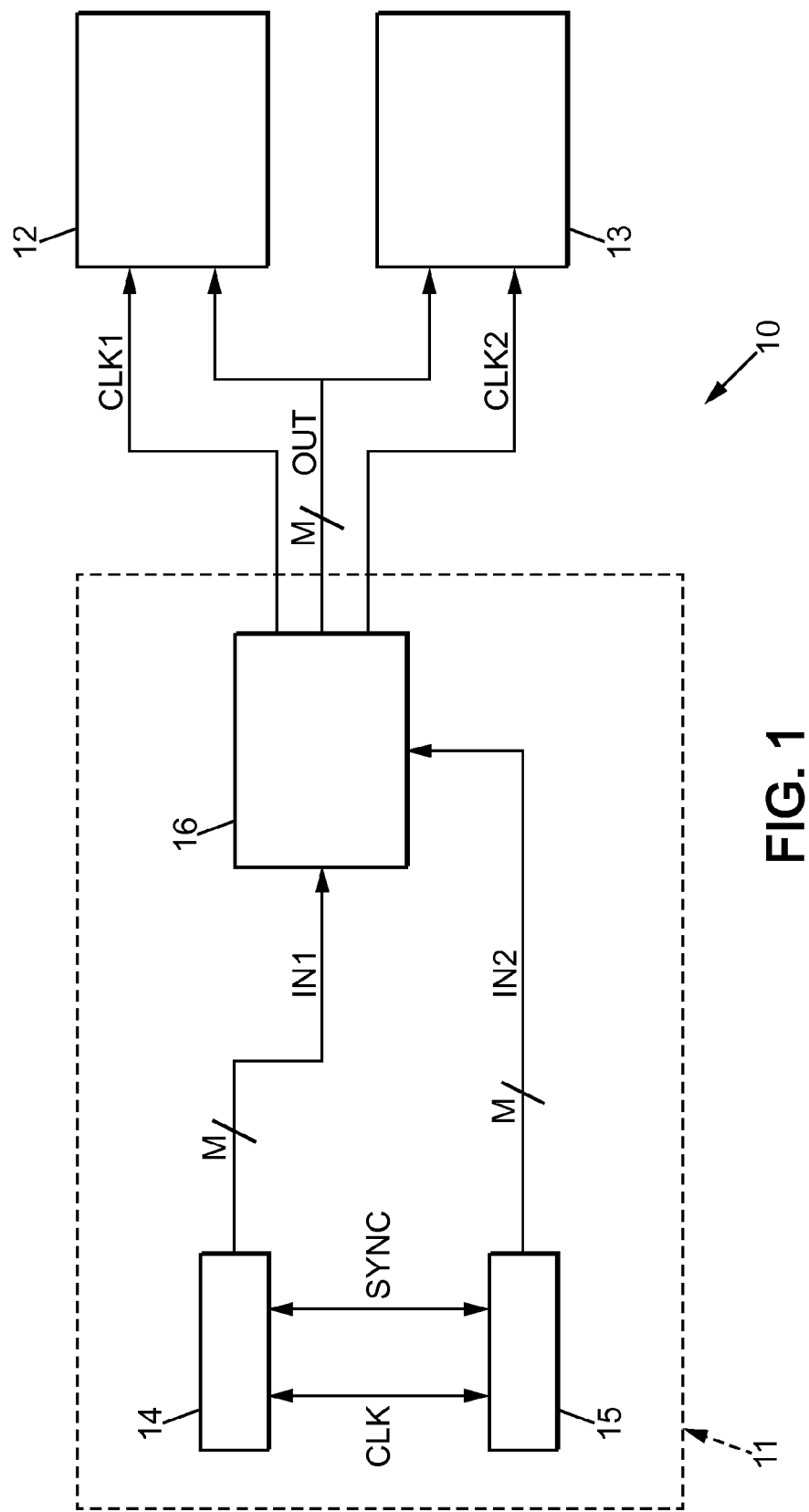
FIG. 1 schematically shows an example of a display system according to embodiments.

Referring to FIG. 1, there will first be described a block-diagram of a display system 10 according to embodiments of the present invention, with a display control unit 11, and a visual display unit having a plurality of displays such as two N-bit screens 12 and 13 as shown. The display control unit cab be implemented as an Integrated Circuit, such as the system-on-chip (SoC), the N-bit screens 12 and 13 being external to the IC as in the shown example.

The SoC can include multiple processing units, such as at least one of a central processing unit (CPU) of microprocessor, a graphical processing unit (GPU), and a digital signal processor (DSP), which are not specifically or individually represented in the figures.

Also, in the embodiment as shown in FIG. 1, the display system 10 comprises two N-bit screens 12, 13, but it will be appreciated that embodiments are not limited to this example, and that more than two N-bit screens can be managed by the display system 11 according to the teaching of the present description.

The N-bit screens 12, 13 according to embodiments are connected to the display control unit 11. Thus, the N-bit screens can be directly driven by the display control unit 11. In addition, the N-bit screens 12, 13 can each be a Liquid Crystal Display (LCD), such as a thin-film transistor (TFT) LCD. Preferably, the N-bit screens 12, 13 are identical displays, meaning that they present the same clock frequency and also the same dimensions (i.e., number of pixels arranged in rows and columns, namely vertically and horizontally, respectively). Having the same N-bit screens 12, 13 simplify the implementation and the design of the display arrangement 10. However, embodiments of the present invention are not limited to such an implementation. In particular, a combination of several N-bit screens which do not have the same numbers of pixel or have the same number of pixels but arranged differently, can be implemented in the display arrangement 10. In embodiments where the screens have respective dimensions, different one from the other, provision can be made for a dedicated HSYNC, VSYNC signal per display (on top of the clock signal).

The display control unit 11 according to embodiments as shown in the drawing figures is suitable for controlling the display of images on a N-bit screen and more precisely on at least two N-bit screens 12, 13 in the described embodiments. To that end, the display control unit 11 can include data processing units 14, 15 and a merger block 16. However, it will be apparent, that the display control unit 11 may comprise multiple processing units and multiple memory units which are not further described here nor shown on the figures.

In the embodiment as shown in FIG. 1, the display control unit 11 comprises a first data processing unit 14 associated with a first N-bit screen 12 through the merger block 16. Also in this embodiment, the display control unit 11 comprises a second data processing unit 15 associated with a second N-bit screen 13, controlled through the same merger block 16. Thus, the merger block 16 can have as many inputs as outputs of all the data processing units. More precisely, in the shown example, the merger block 16 has two inputs each being connected to the output of one of the data processing units 14, 15, respectively. Further, the merger block 16 can have one output associated with each bit of the N-bit screens, respectively. These outputs are respectively connected to all the screens 12, 13.

The data processing units 14, 15 are configured to transmit pixel data to the respective N-bit screen, via the merger block 16, and therefore allow the control of the display of pixels on the N-bit screens. Stated otherwise, each data processing unit transmits information defining the position and the color value of each pixel of the image to be displayed. To that end, each data processing unit 14, 15 may be implemented by a display controller and may contain a usual Red, Green, Blue (RGB) output interface requiring 27 connections. However, those connections are not routed out of the SoC but are merged in the inside merger block 16. In embodiments, each data processing unit 14, 15 may be a 2D-ACE display controller.

Figure 2:
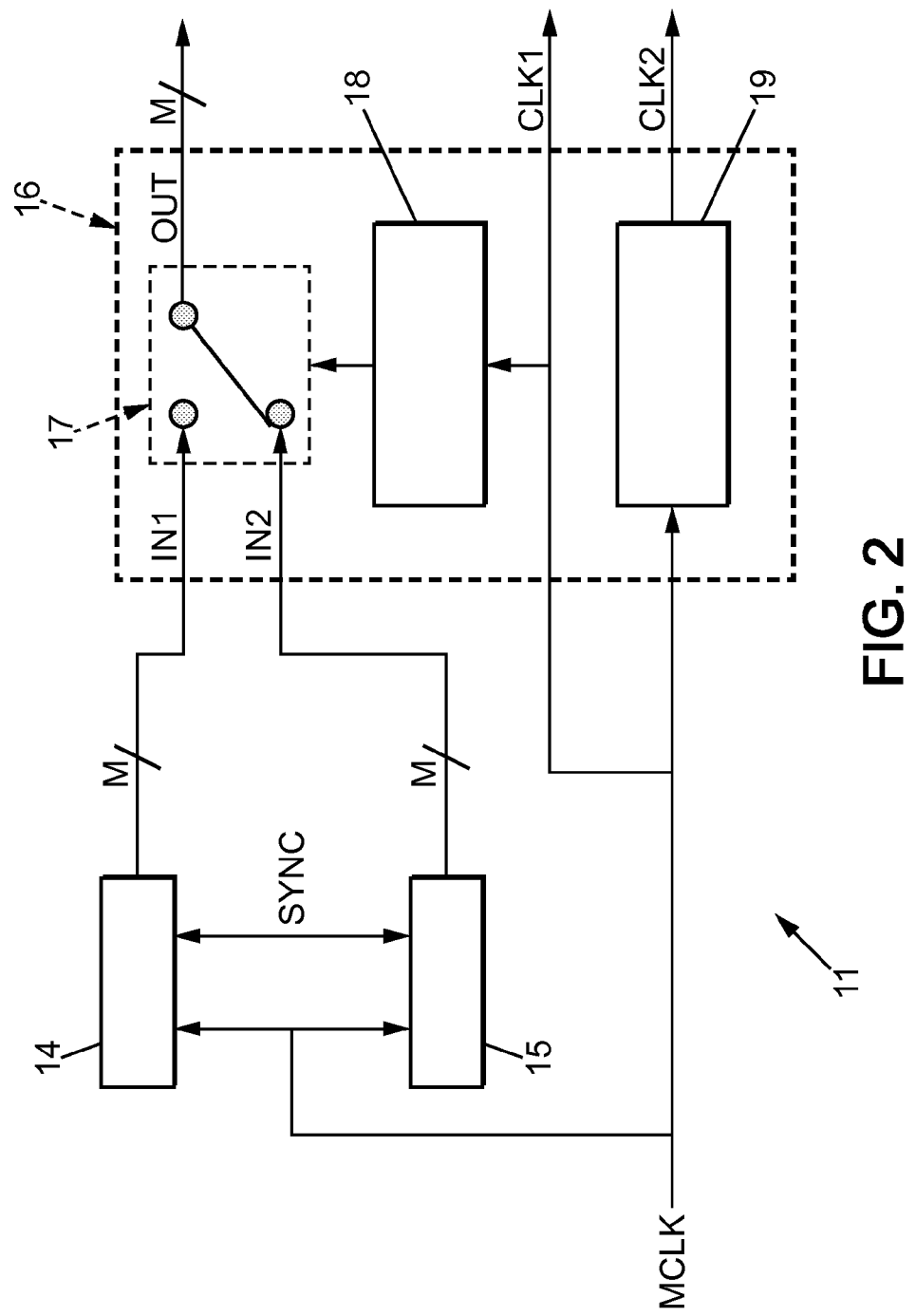
FIG. 2 schematically shows an example of a merger block of the display system of FIG. 1.

Referring now to FIG. 2, there will be described in more details the display control unit 11 of the system of FIG. 1. To ease the reader's understanding, the functioning of the display control unit 11 will be described hereinafter for an example of display system comprising only two 1-bit screens. However, the connections to the screens as illustrated in FIG. 2 have a 45-degree crossing bar which shows that these connections can be a bus with more than one single line, namely N lines in the example as shown, though the following detailed description of the operation of the display control unit 11 will be given below for an example wherein N=1.

In another embodiment not illustrated on the drawing figures, the display system 10 may comprise more than two screens. Thus, the display system 11 may comprise a merger block capable of controlling the display of pixel data of more than two screens and to generate one different clock signal for each of these screens.

Further, in another embodiment, the screens can be N-bit screens, namely screens with N-bit color depth with N>1, such as for example screens with 16 bits per pixel (bpp) or 24 bpp. In addition, the color depth actually used could differ between the two (or more) displays. For instance, in applications where N=24, one display can use only 16 bits of the color information while the other (or one of the others) can use all 24 bits.

The merger block 16 receives respective pixel data from each data processing unit 14, 15 and transmit said pixel data to the corresponding N-bit screen 12, 13. The merger block 16 performs interleaving of data on the component connections of each data processing unit 14, 15 and generates the required timing signals needed to drive the N-bit screens 12, 13. To that end, the merger block 16 can comprise a multiplexer unit 17, a selection unit 18 and a clock generating unit 19.

The multiplexer unit 17 can have several inputs. Each of these inputs is connected to the respective input of the merger block 16 and thus to the respective output of the data processing units 14, 15. Thus, in the example as shown in FIG. 2, a first input signal IN1 having pixel data of the image to be displayed on the first N-bit screen 12 is output from the first data processing unit 14 to a first input of the multiplexer unit 17. Similarly, a second input signal IN2 having pixel data of the image to be displayed on the second N-bit screen 13 is output from the second data processing unit 15 to a second input of the multiplexer unit 17. Further, in embodiments where N>1, the multiplexer unit 17 can have a bank of N multiplexing elementary units with one output per bit of the N-bit screen. These N outputs are connected to respective outputs of the merger block 16, respectively, and thus to all the N-bit screens 12, 13. Thus, in the example as shown in FIG. 2, an output signal OUT having, alternatively, pixel data of the first input signal IN1 or pixel data of the second input signal IN2 is issued from the output of the multiplexer unit 17 to the N-bit screens 12, 13.

More specifically, the multiplexer unit 17 may comprise a multiplexing core. In another embodiment, the multiplexer unit 17 may comprise a plurality of switches disposed in parallel. In the latter embodiment, the merger block 16 can have one switch per bit of the N-bit screen. For example, when two 24-bit screens are comprised in the display system, the merger block 16 can comprise 24 switches. In the embodiment as shown in FIG. 2, for instance, the screens 12, 13 are 1-bit screens and the multiplexer unit 17 has a single switch having a first input coupled to the first data processing unit 14, a second input coupled to the second data processing unit 15 and an output coupled to each screens 12, 13. Further, in the example of the FIG. 2, the merger block 16 only has one output since the screens are 1-bit screens. However, in other embodiments, the merger block 16 can have several outputs, for example 16 outputs for a 16-bit screen.

In addition, the multiplexer unit 17 can be driven by a selection unit 18 as shown in FIG. 2. The selection unit 18 allows the multiplexer 16 to switch to the output the signal received on either one of the inputs based on the main clock signal MCLK.

The clock generating unit 19 generates clock signals, for example, from the main clock signal CLK1. Moreover, the clock generating unit 19 may generate a clock signal to each additional N-bit screen. Thus in the example of the FIG. 2, the clock generating unit 19 generates a second clock signal CLK2 which is used for the second N-bit screen 13.

In the shown example, the main clock signal MCLK is also the first clock signal CLK1 associated with the first N-bit screen 12. Further, the main clock signal MCLK can also be the clock signal of the data processing units 14, 15.

Further, the clock generating unit 19 can generate shifted versions of the main clock signal CLK1 for each clock signal. Thus, each clock signal may have the same duty cycle and the same period but their respective rising edges occur at respective time, as do their respective falling edges. This stems from the fact that logic gates of generating unit 19 inherently introduce a delay which is an unintended side effect of their technology. In the embodiment as shown in FIG. 2 where there are only two 1-bit screens 12, 13, the clock generating unit 19 may also include an inverter. In this example, the first clock signal CLK1 and the second clock signal CLK2 are dual signals.

On each rising edge of a clock signal associated with a respective one of the N-bit screens, the N-bit screen may take over the pixel data from the corresponding data processing unit emitted by the merger interface in order to display it on the N-bit screen. Stated otherwise, the pixel data value may be sampled at the rising edge of one of the clock signals. In another embodiment, the sampling may occur on the falling edge of one of the clock signals, depending on any specific implementation.

Thus, at each rising edge of one of the clock signals, the switch of the multiplexer unit 17 controlled by the selection unit 18 may switch from its first input to its second input or reciprocally, in order to display, alternatively, the pixel data of the first data processing unit 14 and the pixel data of the second data processing unit 15. Since the clock signals are shifted one with respect to the others, the switch can couple one of the inputs to the output when the pixel data is valid on this input. The validity of the pixel data may be detected when the clock signal associated to the N-bit screen on which pixel data is displayed presents a rising edge.

Figure 3:
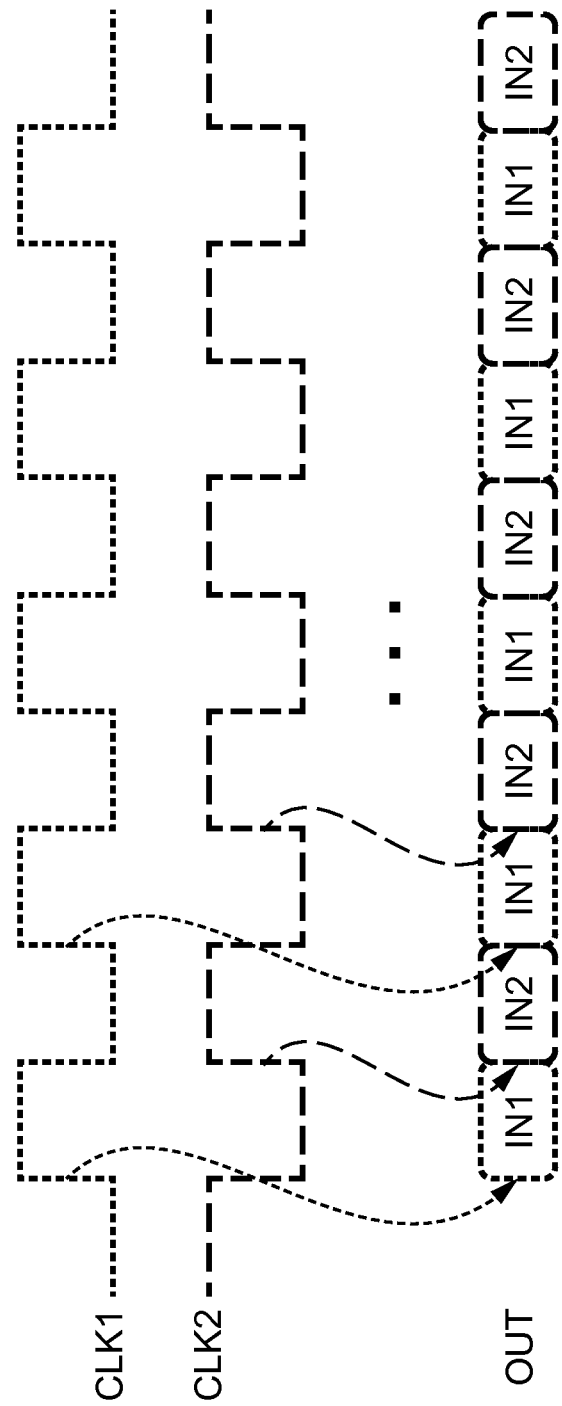
FIG. 3 is a graphic showing operating signals of the display system of FIG. 1.

Referring to FIG. 3, the main clock signal CLK1, the second clock signal CLK2 and the output signal OUT, respectively, are illustrated from top to bottom for one line of 1-bit. Thus, as above mentioned, the output signal OUT of the merger interface 16 delivers, alternatively at each rising edge of the first clock signal CLK1 and at each rising edge of the second clock signal CLK2, the first input signal IN1 and the second input signal IN2, respectively.

In addition, the frequency of the changes of the output signal triggered by the rising edges of each of the clock signals, called the aggregated frequency of the clock signals in what follows, can be less than a maximum frequency defined by the period during which one pixel data must be valid for each N-bit screen. It thus allows efficient display of the pixel data on each N-bit screen since the pixel data can then be valid during the setup time and the hold time of each corresponding N-bit screen. For example, if the screens 12, 13 are 4.3 inches, 480*272 pixels screens with a setup time of 10 ns, a rising edge time of 5 ns and a hold time of 15 ns, the maximum frequency of the sum of all the clock signals' frequency is 33.3 MHZ. Thus, considering a margin of 50%, the aggregated frequency of all the clock signals is 22.2 MHz. In this embodiment, the aggregated frequency of the first clock signal CLK1 and of the second clock signal CLK2 can be chosen to be equal to 22.2 MHz at maximum.

Further, the data processing units 14, 15 may be synchronized one with each other, for instance thanks to a synchronisation signal SYNC coupling the processing units, in order to simplify the pixel display. Indeed, this synchronisation enables the data processing units 14, 15 to deliver, at the same time, the pixel data associated with a pixel positioned at the same location on the corresponding N-bit screen, along both the vertical and the horizontal directions. In addition, assuming that the N-bit screens have similar characteristics, e.g. are identical displays, the processing units 14, 15 can be further synchronized with the horizontal synchronisation signal and the vertical synchronisation signal of each N-bit screen, respectively, which enable to further reduce the pin number of the merger block 16. Else, the merger block 16 might include two more pins, one for each synchronisation signal.

A related method of displaying simultaneously at least two images on at least two N-bit screens respectively can be implemented by using the display system 10 described in the foregoing.

Figure 4:
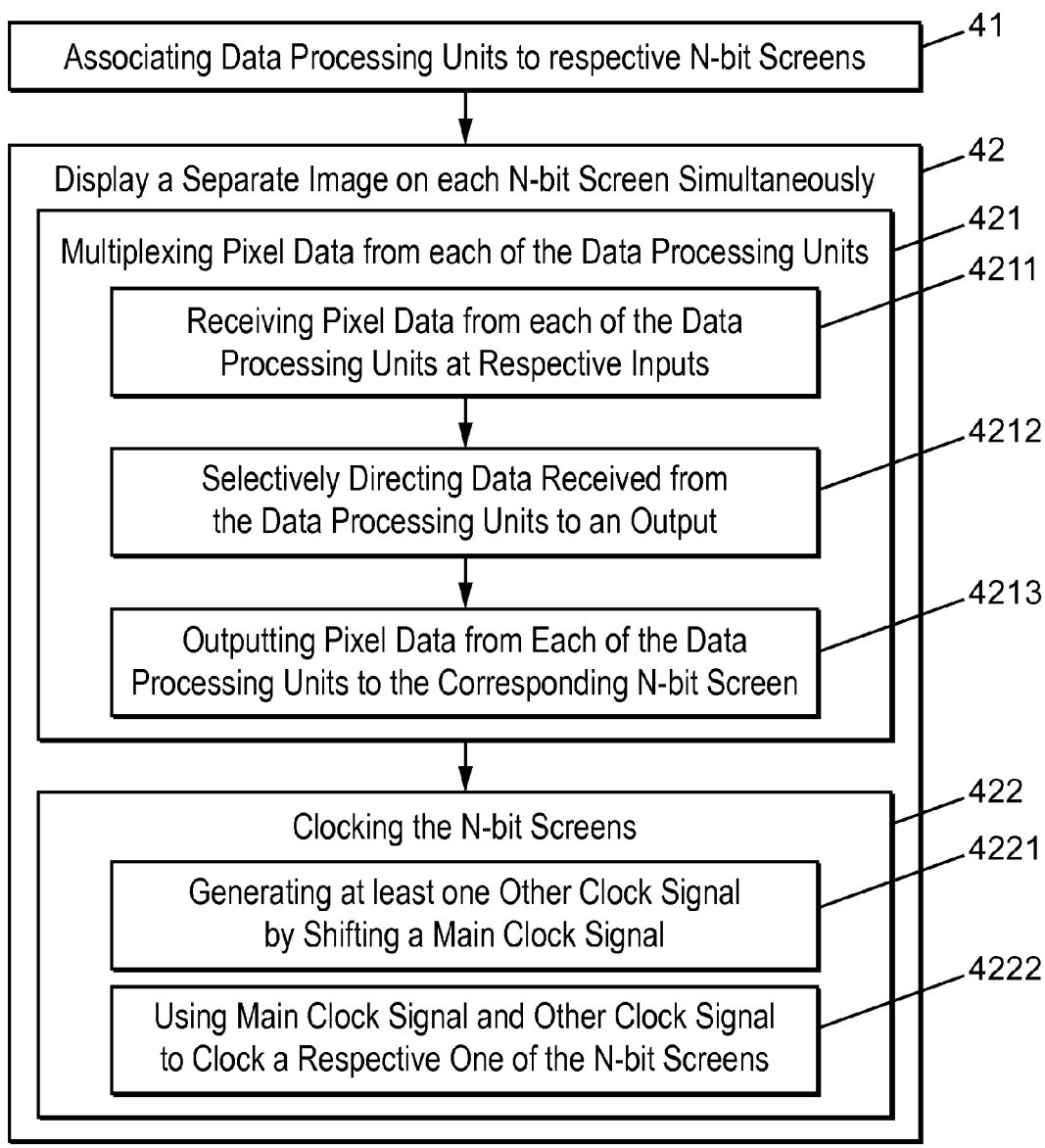
FIG. 4 is a flow diagram of a method of displaying images in accordance with embodiments.

FIG. 4 illustrates a flow diagram of a method of displaying images according to embodiments. For the purposes of description, the method is described in an example context of an implementation of the system of FIG. 1. At block 41, each of at least two data processing units are associated to a respective N-bit screen. At block 42, the processing units and a single merger block having a multiplexer are controlled to display a separate image on each N-bit screen simultaneously.

The controlling at 42 can comprises, at block 421, driving the multiplexer by a selection unit, to multiplex pixel data from each of the data processing units. This can include this following. At block 4211, the multiplexer receiving pixel data from each of the data processing units at a respective input of the merger block. At block 4212, the multiplexer selectively directing data received from one of the data processing units to an output of the merger block. And at block 4213, the multiplexer outputting the pixel data from each of the data processing units to the corresponding N-bit screen.

At block 422, the method further includes clocking the N-bit screens. At block 4221, this includes providing a main clock signal and at least one other clock signal, and generating said other clock signal by shifting said main clock signal. At block 4221, the main clock signal and the other clock signal can be used to clock a respective one of the N-bit screens.

In some embodiments, the method can further comprise synchronizing the data processing units one with each other, as shown on FIGS. 1 and 2.

With the above described display system and the associated method of displaying, it is thus possible to provide an efficient and low cost way to connect at least two displays to one slightly extended display interface in order to display simultaneously different images on different N-bit screens respectively. To achieve this result, the above described merger interface, meaning combining a multiplexer unit with the fact that each N-bit screen has a respective clock signal, allows the sharing of component connections, i.e. Red, Green, and Blue connections, among the N-bit screens. Thus, for example for identical 24-bit screens, the same 8 connections lines describing the red intensity are connected to all data processing unit, then to the merger block and also to all N-bit screens (it is the same for the 8 connections lines describing the blue intensity and also for the 8 connection lines describing the green intensity). Therefore, for a single chip application whatever the N-bit screen number, the display system only needs one output pins for each bit of the 24-bit screen (so 24 pins in the previous example), two pins for the synchronisation signals (namely HSYNC and VSYNC) and one pin for each clock signals. In total in this example of two 24-bit screens, the display system has 27 pins if the display can be configured to accept the falling edges so that even the clock signal can be shared by both screens, or has 28 pins if an additional clock pin is required. This reduced number of pins enables using, for a single ship application, a QFP package for connecting the merger block.

Further, having a respective signal clock for each N-bit screen combined with the fact that each signal clock is shifted one from the others allows to actually specify when the data is valid and for which display it is valid.

Furthermore, separating the sampling of the all N-bit screen allows displaying different images on each N-bit screen. Therefore, the present solution enables to combine at least two images into a single synchronous signal where at least two clock signals extract the pixel data independently. Besides, having one clock signal per N-bit screen allows the pixel data to be transmitted directly to the corresponding standard N-bit screen without any further demultiplexing.

In addition, having a separate connection per display (i.e. 27 lines in total in the above example) leads to at least the same refresh rate and identical quality, but is really a cost saving measure.

The above described display system may be applied to the automobile field, for example in the dashboard application where several displays are needed while the surface available for displaying information is restricted to the tiny space of the dashboard laying under the driver's eyes and further while the cost of the automobile equipment need to be very low.

Of course, the above described display system may be applied to other applications in which it is desirable to have multiple displays connected to a same system. Such applications include any kinds of applications wherein information needs to be displayed on a N-bit screen, for example in industrial control with multiple display or in general entertainment solution with multiple N-bit screens or, again, avionics or in consumer electronics, e.g. portable electronic equipment with display.

Various aspects of the invention have been described in the foregoing with reference to specific embodiments. It will, however, be evident to the one with ordinary skills in the art that various modifications and changes may be made therein without departing from the broader scope of the invention as set forth in the appended claims Some of the above embodiments, as applicable, may be implemented using a variety of different information processing systems. For example, although the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Also for example, in one embodiment, the illustrated elements of system are circuitry located on a single integrated circuit or within a same device. Alternatively, system may include any number of separate integrated circuits or separate devices interconnected with each other. For example, memory may be located on a same integrated circuit as masters or on a separate integrated circuit or located within another peripheral or slave discretely separate from other elements of system. Peripheral and I/O circuitry may also be located on separate integrated circuits or devices. Also for example, system or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system, for example, from computer readable media such as memory or other media on other computer systems. Such computer readable media may be permanently, removably or remotely coupled to an information processing system such as the system of FIGS. 1 and 2. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, the system is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Because the system implementing the present invention is, for the most part, composed of electronic components and circuits known to those skilled in the art, circuit details have not be explained in any greater extent than that considered necessary as illustrated above, for the understanding and appreciation of the underlying concepts of the present invention and in order not to obfuscate or distract from the teachings of the present invention.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A display system comprising:
a visual display unit with at least two N-bit screens;
a display control unit with:
at least two data processing units, each being associated with a corresponding N-bit screen and arranged for controlling the display of pixels on the corresponding N-bit screen; and
a single merger block arranged for receiving pixel data from each of the data processing units and for outputting said pixel data to the associated N-bit screen, wherein the merger block comprises
an input corresponding to each data processing unit and coupled to the corresponding data processing unit, and an output,
a multiplexer unit arranged for selectively directing data from one of the data processing units received on a respective one of the inputs to the output of the merger block,
a selection unit arranged for driving said multiplexer unit,
a clock generating unit arranged for providing a separate clock signal for each of the N-bit screens, wherein one clock signal is a main clock signal, and each other clock signal is generated by shifting said main clock signal, said main clock signal and said other clock signal being used to clock a respective one of the N-bit screens, and
wherein the display control unit is configured to cause the display of a separate image on each N-bit screen simultaneously.

2. The display system of claim 1, wherein the data processing units are synchronized one with the other.

3. The display system of claim 1, wherein the visual display unit comprises two N-bit screens and wherein the main clock signal and the other clock signal are dual signals.

4. The display system of claim 1, wherein the N-bit screens are identical displays.

5. The display system of claim 1, wherein the data processing units are synchronized with the horizontal and vertical synchronization of the N-bit screens.

6. The display system of claim 1, wherein each data processing unit is a 2D Animation and Composition Engine ("2D-ACE") display controller.

7. The display system of claim 1, wherein the multiplexer unit has at least two inputs, each input being connected to the respective data processing unit, and one respective output per bit of the N-bit screens, each output being connected to all the N-bit screens.

8. The display system of claim 1, wherein each of the N-bit screens is a Liquid Crystal Display.

9. An integrated circuit comprising:
at least two data processing units, each being associated with a corresponding N-bit screen external to the integrated circuit and arranged for controlling the display of pixels on the corresponding N-bit screen; and
a single merger block arranged for receiving pixel data from each of the data processing units and for outputting said pixel data to the associated N-bit screen, wherein the merger block comprises
an input corresponding to each data processing unit and coupled to the corresponding data processing unit, and an output, a multiplexer unit arranged for selectively directing data from one of the data processing units received on a respective one of the inputs to the output of the merger block, a selection unit arranged for driving said multiplexer unit, a clock generating unit arranged for providing a separate clock signal for each of the N-bit screens, wherein one clock signal is a main clock signal, and each other clock signal is generated by shifting said main clock signal, said main clock signal and said other clock signal being used to clock a respective one of the N-bit screens, and the integrated circuit being configured to cause the display of a separate image on each N-bit screen simultaneously.

10. The integrated circuit of claim 9, wherein the data processing units are synchronized one with the other.

11. The integrated circuit of claim 9, wherein the main clock signal and the other clock signal are dual signals.

12. The integrated circuit of claim 9, wherein the data processing units are synchronized with the horizontal and vertical synchronization of the N-bit screens.

13. The integrated circuit of claim 9, wherein each data processing unit is a 2D Animation and Composition Engine ("2D-ACE") display controller.

14. The integrated circuit of claim 9, wherein the multiplexer unit has at least two inputs, each input being connected to the respective data processing unit, and one respective output per bit of the N-bit screens, each output being arranged for being connected to all the N-bit screens.

15. The integrated circuit of claim 9, comprising at least one of: one or more processing cores, on-chip memory, an external memory interface, and a display control unit.

16. The integrated circuit of claim 9 implemented as a System-On-Chip.

17. A method of displaying images comprising:

associating each of at least two data processing units to a respective N-bit screen;

controlling the processing units and a single merger block having a multiplexer, to display a separate image on each N-bit screen simultaneously, wherein said controlling comprises:

driving the multiplexer by a selection unit, said driving comprising:

the multiplexer receiving pixel data from each of the data processing units at a respective input of the merger block;

the multiplexer selectively directing data received from one of the data processing units to an output of the merger block;

the multiplexer outputting the pixel data from each of the data processing units to the corresponding N-bit screen; and, providing a main clock signal and at least one other clock signal and generating said other clock signal by shifting said main clock signal, said main clock signal and said other clock signal being used to clock a respective one of the N-bit screens.

18. The method of claim 17, further comprising synchronizing the data processing units one with each other.

19. The method of claim 17, wherein the main clock signal and the other clock signal are dual signals.

20. The method of claim 17, further comprising synchronizing the data processing units with the horizontal and vertical synchronization of the N-bit screens.

* * * * *